US008462624B2

(12) United States Patent
McCanne et al.

(10) Patent No.: US 8,462,624 B2
(45) Date of Patent: Jun. 11, 2013

(54) CONGESTION MANAGEMENT OVER LOSSY NETWORK CONNECTIONS

(75) Inventors: Steve McCanne, Berkeley, CA (US); Nitin Gupta, San Francisco, CA (US)

(73) Assignee: Riverbed Technologies, Inc., San Francisco, CA (US)

( * ) Notice: Subject to any disclaimer, the term of this patent is extended or adjusted under 35 U.S.C. 154(b) by 1436 days.

(21) Appl. No.: 11/494,025

(22) Filed: Jul. 26, 2006

(65) Prior Publication Data
US 2007/0086335 A1 Apr. 19, 2007

Related U.S. Application Data

(60) Provisional application No. 60/703,679, filed on Jul. 28, 2005.

(51) Int. Cl.
*H04L 12/26* (2006.01)
(52) U.S. Cl.
USPC .............................. 370/230; 370/241; 714/48
(58) Field of Classification Search
USPC .................... 370/230, 229; 348/617; 714/818
See application file for complete search history.

(56) References Cited

U.S. PATENT DOCUMENTS

| | | | | |
|---|---|---|---|---|
| 6,289,054 | B1* | 9/2001 | Rhee | 375/240.27 |
| 6,907,473 | B2 | 6/2005 | Schmidt et al. | |
| 6,990,069 | B1* | 1/2006 | Ramakrishnan | 370/229 |
| 2004/0015591 | A1* | 1/2004 | Wang | 709/228 |
| 2004/0160979 | A1* | 8/2004 | Pepin et al. | 370/462 |
| 2004/0196860 | A1* | 10/2004 | Gao et al. | 370/437 |
| 2004/0264366 | A1* | 12/2004 | Swami | 370/229 |
| 2005/0008037 | A1 | 1/2005 | Koren et al. | |
| 2006/0190594 | A1* | 8/2006 | Jorgenson et al. | 709/224 |
| 2006/0251067 | A1 | 11/2006 | Desanti et al. | |
| 2006/0268893 | A1* | 11/2006 | Lataretu | 370/395.21 |

OTHER PUBLICATIONS

Barakat, Chadi et al., "Bandwidth tradeoff between TCP and link-level FEC," 2002, *Computer Networks*, vol. 39, pp. 133-150.
Lundqvist; Henrik et al., "TCP with End-to-End forward Error Correction," Feb. 18-20, 2004, *International Zurich Seminar on Communications*, IZS 2004, KTH, Royal Institute of Technology, Stockholm, Sweden.
Baldantoni, Luca et al.; "Adaptive End-to-End FEC for Improving TCP Performance over Wireless Links"; 2004, *IEEE Communications Society*, pp. 4023-4027.

(Continued)

*Primary Examiner* — Chi Pham
*Assistant Examiner* — Mohammad Adhami
(74) *Attorney, Agent, or Firm* — Davis Wright Tremaine LLP; Philip H. Albert (57) ABSTRACT

A network stack includes a packet loss analyzer that distinguishes between packet losses due to congestion and due to lossyness of network connections. The loss analyzer observes the packet loss patterns for comparison with a packet loss model. The packet loss model may be based on a Forward Error Correction (FEC) system. The loss analyzer determines if lost packets could have been recovered by a receiving network device, if FEC had been used. If the lost packets could have been corrected by FEC, the loss analyzer assumes that no network congestion exists and that the packet loss comes from the lossy aspects of the network, such as radio interference for wireless networks. If the loss analyzer determines that some of the lost packet could not have been recovered by the receiving network device, the loss analyzer assumes that network congestion causes these packet losses and reduces the data rate.

13 Claims, 6 Drawing Sheets

OTHER PUBLICATIONS

Jacobson, Van; "Congestion Aviodance and Control"; 1988, *Proceedings of ACM SIGCOMM*, pp. 314-329.

Mathis, M. et al.; "TCP Selective Acknowledgment Options"; 1996, *Sun Microsystems Network Working Group*, 12 pages.

Paxson, Vern; "Measurements and Analysis of End-to-End Internet Dynamics"; LBNL-40319, 386 pages.

Balakrishman, Hari et al.; "A Comparison of Mechanisms for Improving TCP Performance over Wireless Links"; 1996, *Proceedings of the ACM SIGCOMM*, pp. 1-14.

Baldantoni, Luca et al.; "Adaptive End-to-End FEC for Improving TCP Performance over Wireless Links"; 2004, *IEEE Communications Society*, pp. 4023-4027.

Eddy, Wesley M. et al.; "New Techniques for Making Transport Protocols Robust to COrruption-Based Loss"; 2004, *ACM SIGCOMM Computer Communications Review*, vol. 34, No. 5, pp. 75-88.

Jacobson, Van; "Congestion Aviodance and Control"; 1988, *Proceedings of ACM SIGCOMM*, pp. 314-329.

Mathis, M. et al.; "TCP Selective Acknowledgment Options"; 1996, *Sun Microsystems.Network Working Group*, 12 pages.

Paxson, Vern; "Measurements and Analysis of End-to-End Internet Dynamics"; *LBNL*-40319, 386 pages, 1997.

Allman, M., et al., "RFC2581—TCP Congestion Control," Network Working Group, Apr. 1999, 14 pages.

Knutsson, Bjorn, et al., "Transparent Proxy Signalling," 2001, 11 pages, http://citeseerx.ist.psu.edulviewdoc/summary?doi=10.1.1.20.123.

Rodriguez, Pablo, et al., "TPOT: Translucent Proxying of TCP," Computer Communications, Feb. 2000, vol. 24, No. 2, pp. 249-55, http://citeseerx.ist.psu.edu/viewdoc/summary?doi=10.1.1.20.123.

* cited by examiner

CONGESTION MANAGEMENT OVER LOSSY NETWORK CONNECTIONS

CROSS-REFERENCES TO RELATED APPLICATIONS

This application claims priority to U.S. Provisional Patent Application No. 60/703,679, filed Jul. 28, 2005, entitled "TCP over Lossy Channels," which is incorporated by reference herein for all purposes. This application is related to and incorporates by reference for all purposes U.S. patent application Ser. No. 10/285,315, Filed 30 Oct. 2002, entitled "Transaction Accelerator for Client-Server Communication Systems," (Hereafter "McCanne I").

BACKGROUND OF THE INVENTION

This invention relates to the field of data networking, and specifically to systems and methods of optimizing network communications. Networking protocols are often described in terms of the Open Systems Interconnection (OSI) model. Within the OSI model, the transport layer provides for reliable delivery of data, typically encapsulated in network packets, from a sender to receiver. To ensure complete and reliable data transfer, the transport layer is typically responsible for error detection and recovery and flow control. Common transport layer protocols include the transmission control protocol (TCP) and User Datagram Protocol (UDP).

To implement reliable data delivery, TCP uses the well-known Automatic Repeat reQuest (ARQ) technique. Specifically, the receiver explicitly acknowledges data as it is received. If data is not acknowledged by the receiver within a time period, the sender presumes this data is lost and retransmits the data.

TCP also seeks to prevent network congestion. Congestion occurs when packets are injected into a network at a rate faster than the network is able to deliver them. Network devices tolerate brief bursts of data by buffering (alternatively called queuing) incoming packets until they can be delivered. Because the memory available in network devices for packet queues is limited and because queuing introduces extra latency, the amounts of data that can be queued by network devices on a network are limited. When network packets arrive so quickly that they cannot all be queued, a network device discards or drops some network packets. Eventually, the sender detects that some network packets have been dropped and will retransmit this data. The mismatch between packet transmission rate and the network capacity, and the resulting packet loss, is congestion.

TCP congestion avoidance systems work by detecting packet loss due to congestion in the network. Upon detecting network congestion, TCP congestion avoidance systems will reduce the rate of network traffic to alleviate network congestion. A congestion control algorithm seeks to limit network congestion by adjusting the rate at which data is sent from a host or application to match the amount of available bandwidth, thus avoiding the condition where network queues fill up indefinitely and cause sustained and undesirable packet loss.

Typical TCP congestion avoidance systems specify the maximum amount of data that may be unacknowledged at any time. This limit is referred to as a congestion window. A sender will temporarily stop transmitting data when the amount of unacknowledged data equals the size of the congestion window and will resume data transmission as data is acknowledged by the receiver or presumed lost. Typically, network devices incrementally increase the size of their congestion windows as long as there is no symptoms of network congestion. As the network becomes congested, queues within network devices become full and cause packet loss. When the sender detects lost or dropped packets, it reduces the size of the congestion window, thereby reducing the data transmission rate and any network congestion.

Typically, the network layer, such as Internet Protocol or IP, underlying the transport layer does not provide explicit feedback to network devices about network congestion. Instead, network devices infer whether the network is congested based upon their own observations of packet loss.

In many networks, congestion is indeed the predominant source of packet loss so this algorithm works well in general. However, when network data is transferred over a lossy network connection, such as wireless or satellite network connection, network packets may be lost even if there is no network congestion. For example, radio interference will often cause the loss or corruption of some network packets in wireless network connections, regardless of the rate of data transmission. Previous congestion avoidance systems misinterpret this network packet loss as a sign of network congestion and reduce the transmission rate of network traffic unnecessarily. As a result, lossy network connections operate slower than necessary and are under-utilized.

To counteract this, some prior network devices employ Forward Error Correction (FEC) to detect and correct lost or corrupt network packets. At the sending network device, FEC analyzes the data being transmitted and creates extra error correction data. The original network data and the error correction data are then sent to the receiving network device. The receiving network device can use this error correction data to detect lost data and potentially recover small amounts of corrupt data. By recovering some corrupted data, FEC reduces the rate of packet loss over lossy network connections.

However, even with FEC, there will still be some packet loss over network connections, resulting in network under-utilization. Moreover, FEC requires the transmission of additional error correction information. Thus, any increases in network performance due to reduced packet loss from FEC are reduced if not eliminated by the amount of network bandwidth required to communicate the extra error correction information.

It is therefore desirable for a system and method to provide improved network performance over lossy network connections. It is desirable for the system and method to distinguish between the packet loss inherent in lossy network connections and the packet loss due to network congestion. It is further desirable for the system and method to operate without requiring additional network bandwidth or overhead for error correction data.

BRIEF SUMMARY OF THE INVENTION

An embodiment of the invention includes a packet loss analyzer adapted to work with a network transport layer of a network stack to detect packet loss due to congestion and to adjust the data rate accordingly. The loss analyzer observes the pattern of packet losses and compares this pattern with a packet loss model. The packet loss model may be based on a simulation or approximation of a Forward Error Correction (FEC) system. The loss analyzer determines which lost packets could have been repaired or recovered by a receiving network device, if FEC had actually been used. If the loss analyzer determines that all of the packet losses could have been corrected by FEC, then the loss analyzer assumes that no network congestion exists and that all of the packet loss is due to the lossy aspects of the network, such as radio interference for wireless networks. As a result, the loss analyzer instructs the transport layer to maintain the data rate.

Conversely, if the loss analyzer determines that at least some of the lost packet could not have been recovered by on the receiving network device, then the loss analyzer assumes that these lost packets were caused by network congestion. As a result, the loss analyzer directs the transport layer to reduce the size of the congestion window. As a result, the transport layer lowers its data rate, thereby reducing network congestion.

In an embodiment, the network stack does not actually use FEC to generate and transmit additional error correction data. As a result, there is no additional network overhead required. Instead, the loss analyzer uses the packet loss model to estimate network congestion and adjust the congestion window size accordingly. In an embodiment, lost packets are detected by the sending network device and retransmitted as needed. The receiving network device does not recover or reconstruct lost packets using error correction data.

In a further embodiment, instead of actually performing FEC encoding on the transmitted data and comparing this with the packet loss observations, the loss analyzer uses a characterization of block-based FEC including two parameters (n, k), where n is the number of source packets in each block and k is the number of redundant packets that are created for each block. This characterization assumes that the original source could have been reconstructed from any arbitrary n packets out of the encoded block of n+k packets. If more than k packets are lost, then the loss analyzer assumes that these excess lost packets were lost due to congestion. In response to this determination, an embodiment of the loss analyzer directs the transport layer to reduce the size of the congestion window. Conversely, if there are k or less lost packets out of the n+k most recent packets being tracked, transport layer leaves the congestion window unmodified.

BRIEF SUMMARY OF THE DRAWINGS

The invention will be described with reference to the drawings, in which.

DETAILED DESCRIPTION OF THE INVENTION

Figure 1:
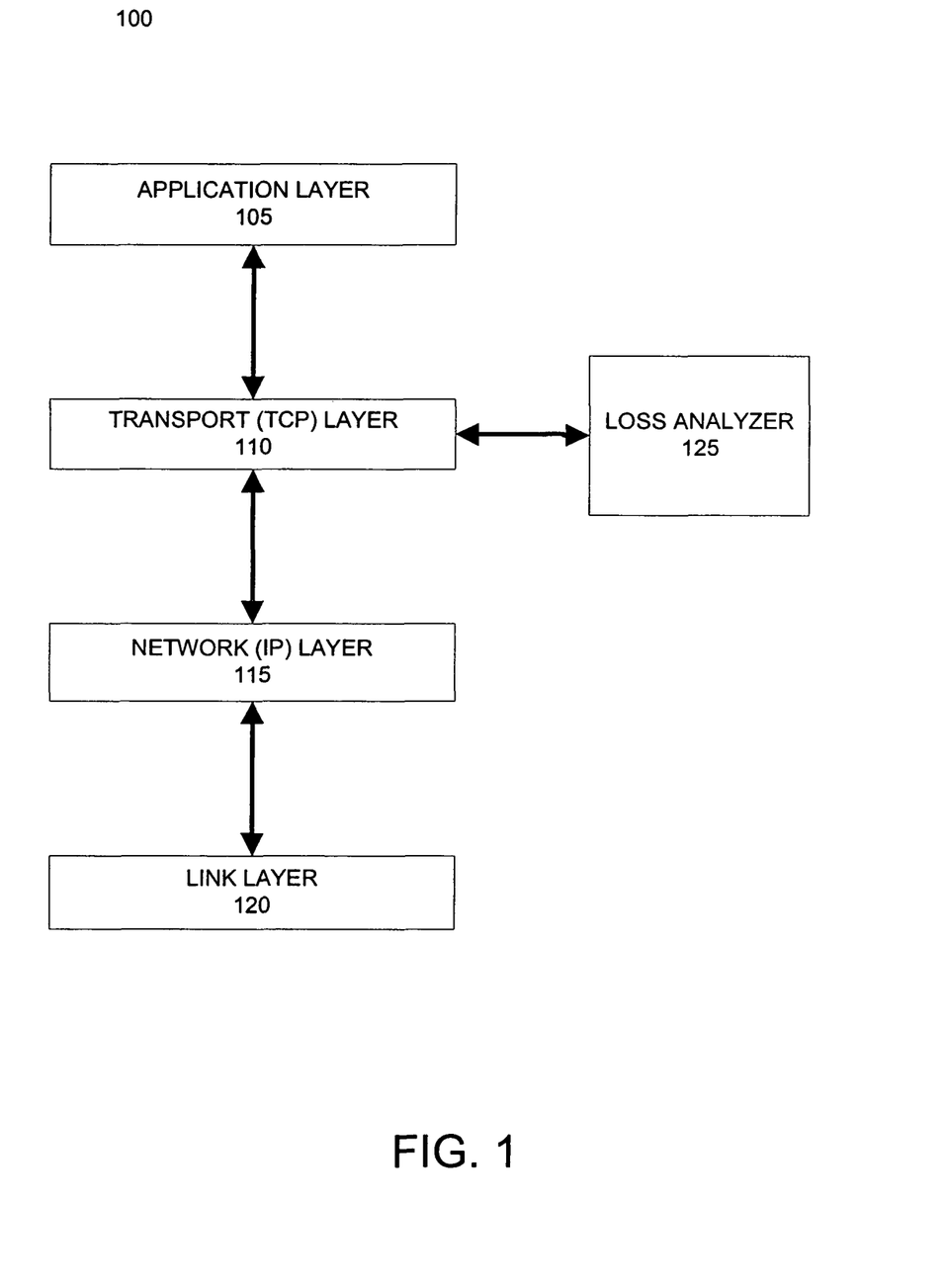
FIG. 1 illustrates an example network stack according to an embodiment of the invention.

FIG. 1 illustrates an example network stack 100 according to an embodiment of the invention. Network stack 100 models network communications as the operation of multiple layers of functionality. In an embodiment, network stack 100 is based on the widely known OSI network stack model, an example of which is the commonly-used TCP/IP stack. Network stack 100 includes an application layer 105. Application layer 105 provides an application for accessing data via a network. Example applications can include e-mail, web browser, database, terminal, and file sharing applications.

Network stack 100 also includes a transport layer 110. Transport layer 110 manages network traffic to provide the application layer 105 and any intervening layers with the functionality of one or more continuous network connections, rather than a stream of unrelated data packets. Transport layer 110 is typically responsible for error detection and recovery, flow control, and congestion management. Examples of transport layers 110 include TCP, SCTP, and UDP. As discussed in the background, the transport layer 110 may employ a congestion window to control the rate of data transmission and prevent network congestion. Transport layer 110 will attempt to transmit packets as quickly as possible, until the size of the unacknowledged packets equals the congestion window.

Network layer 115 provides for transferring packets of data from a source to a destination via one or more networks. The network layer 115 performs network routing functions to direct packets to their appropriate destinations. A common network layer 115 is the Internet Protocol (IP).

The link layer 120 provides the means to transfer data between network entities. Ethernet and the various 802.11 wireless networking standards are examples of the link layer 120.

In addition to these layers, an embodiment of the network stack 100 may also include other layers, such as a physical layer, a session layer, and a data representation layer, as defined by the OSI reference model. For clarity, these layers have been omitted from FIG. 1.

Unlike the standard OSI reference model, network stack 100 also includes a loss analyzer 125. An embodiment of loss analyzer 125 is adapted to work with the transport layer 110 to detect packet loss due to congestion and adjust the size of the congestion window of the transport layer 110 accordingly. In this embodiment, the loss analyzer 125 is used by the sending network device to control the rate of data transmission. The loss analyzer 125 observes the pattern of packet losses and the transport layer 110 uses a modified congestion control algorithm to react to only the loss events that the analyzer determines as relevant.

In an embodiment, the loss analyzer 125 simulates a hypothetical Forward Error Correction (FEC) system. The loss analyzer 125 observes the pattern of packet loss and determines which lost packets could have been repaired or recovered by the receiving network device, if FEC had actually been used. If the loss analyzer 125 determines that all of the packet losses could have been corrected by FEC, then the loss analyzer 125 assumes that no network congestion exists and that all of the packet loss is due to the lossy aspects of the network, such as radio interference for wireless networks. As a result, the loss analyzer 125 instructs the transport layer 110 to keep the congestion window at the same size.

Conversely, if the loss analyzer 125 determines that at least some of the lost packet could not have been recovered by FEC on the receiving network device, then the loss analyzer 125 assumes that these lost packets were caused by network congestion. As a result, the loss analyzer 125 directs the transport layer 110 to reduce the size of the congestion window. As a result, the transport layer 110 lowers its data rate, thereby reducing network congestion.

It should be noted that this embodiment of network stack 100 does not actually use FEC to generate and transmit additional error correction data. As a result, there is no additional network overhead required. Instead, the loss analyzer 125 simulates the operation of FEC merely to estimate network congestion and adjust the congestion window size accordingly. In this embodiment, lost packets are detected by the sending network device and retransmitted as needed. The receiving network device does not recover or reconstruct lost packets using error correction data. The use of simulated FEC to estimate and control network congestion is referred to herein as "virtual FEC."

Embodiments of loss analyzer 125 may simulate or approximate the operation of any type of FEC encoding scheme known in the art, including Hamming codes and Reed-Solomon codes. In a further embodiment, the specific type of FEC encoding scheme is largely irrelevant to the operation of loss analyzer 125. Instead of actually performing FEC encoding on the transmitted data and comparing this with the packet loss observations, it is observed that block-based FEC algorithms are characterized by two parameters (n, k), where n is the number of source packets in each block and k is the number of redundant packets that are created for each block. For each block of n source packets, the original n packets as well as the k encoded packets are transmitted, for a total of n+k packets. At the decoder, the original source packets may be reconstructed from any arbitrary n packets out of the encoded block of n+k packets. Thus, n packets (or n amount of data, if packets are of different sizes) may be recovered from n+k packets (or n+k amount of data). If more than k packets are lost, then the loss analyzer 125 assumes that these excess lost packets were lost due to congestion.

Thus, an embodiment of the loss analyzer uses a scoreboard or other data structure to track the status of the most recently transmitted n+k packets. The values of n and k may be predetermined based on the characteristics of typical FEC algorithms. Alternatively, n and k may be configured based on an estimate of the loss characteristics of the network. The loss analyzer 125 determines that there is network congestion whenever there are more than k lost packets out of the n+k most recent packets being tracked. In response to this determination, the loss analyzer 125 directs the transport layer 110 to reduce the size of the congestion window. Conversely, if there are k or less lost packets out of the n+k most recent packets being tracked, transport layer 110 leaves the congestion window unmodified.

Figure 2A:
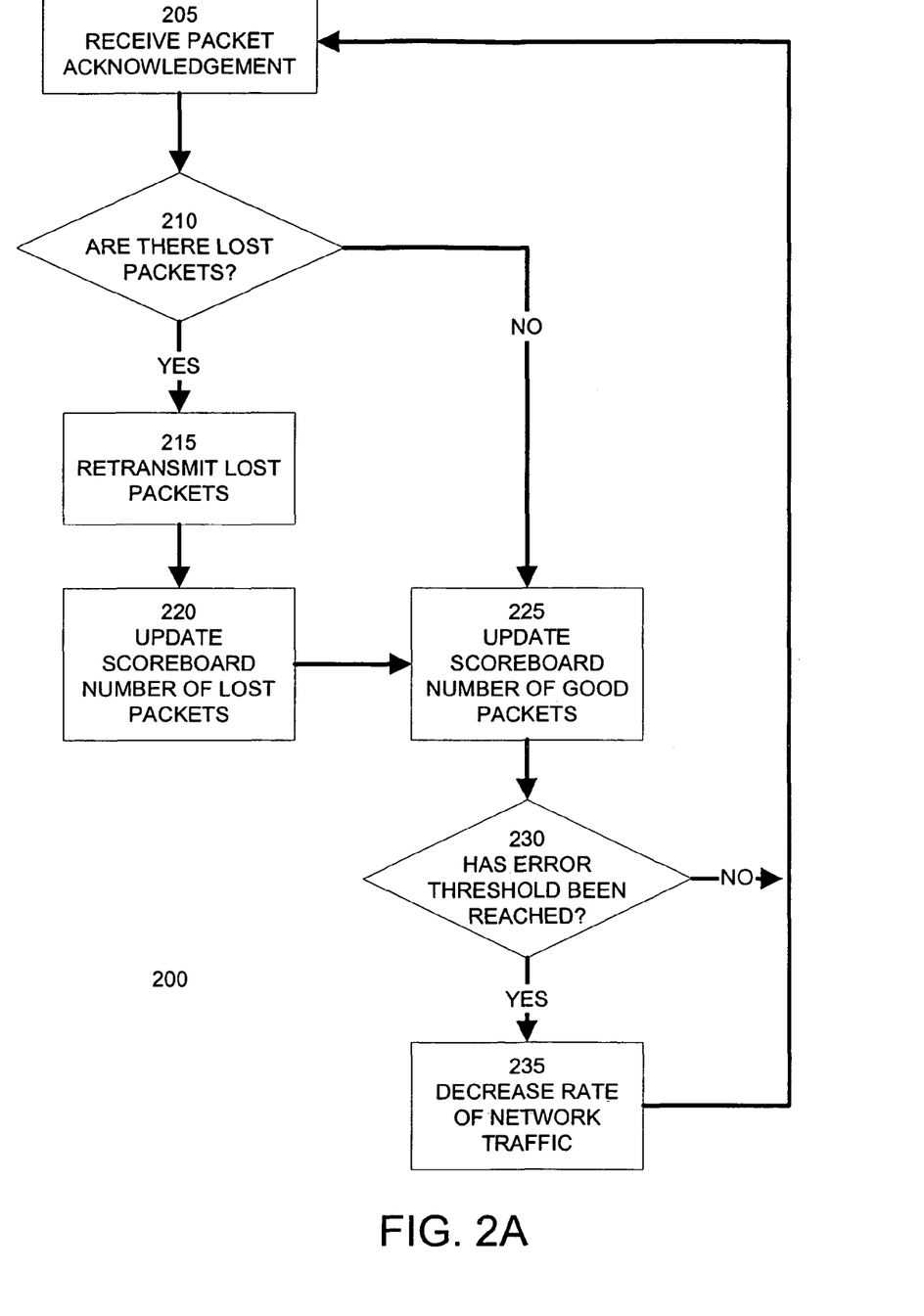
FIGS. 2A-2B illustrate methods of detecting and compensating for network congestion and packet loss over lossy network connections according to embodiments of the invention.

FIG. 2A illustrates a method 200 of detecting and compensating for network congestion and packet loss over lossy network connections according to an embodiment of the invention. Step 205 receives a packet acknowledgement from a receiving network device, the packet acknowledgement indicates to the sending network device that an associated network packet has been successfully received by the receiving network device.

Step 210 determines from the packet acknowledgement and other attributes if there are any lost packets. Packet loss can be determined in a number of different ways known in the art. In some transport protocols, a sequence numbers are associated with the transmitted data. The receiving network device includes the highest consecutive sequence number it has received in the packet acknowledgement message. The sending network device can compare the received sequence number with the highest sequence number of transmitted data to determine if any intervening data has been lost. Typically, step 210 may also employ timers or timestamps associated with transmitted data to account for round trip travel time between the sending and receiving network devices. Additionally, if no acknowledgement of the most recently transmitted data is received within a time period, step 210 may assume that the most recently transmitted data has been lost.

If step 210 determines that no packets have been lost, method 200 proceeds to step 225. Conversely, if step 210 determines that one or more packets have been lost, method 200 proceeds to step 215 to retransmit one or more lost packets or portions thereof, depending upon the transport protocol.

Step 220, which may be executed before, in parallel with, or after step 215, updates the scoreboard of the loss analyzer 125 with the number of lost packets. In an embodiment, step 220 only needs to record the number of outstanding lost packets (or amount of lost data). In other embodiments, step 220 may record the location or sequence numbers associated with lost packets, if the FEC being simulated is dependent on the position of lost data.

Following step 220 or step 210, step 225 updates the scoreboard with the number of good, or successfully received, packets. Like step 220, an embodiment of step 225 only needs to record the number of good packets (or amount of successfully received data). In other embodiments, step 220 may record the location or sequence numbers associated with successfully received packets, if the FEC being simulated is dependent on the position of lost data.

Step 230 determines whether the error threshold has been reached based on the current scoreboard values. In an embodiment, the error threshold is based on the amount of packets (or data) that can be recovered using FEC. As discussed above, if there are n+k packets monitored, then in an embodiment the error threshold is k packets. If the number of lost packets (or amount of lost data) exceeds this threshold, then it is assumed that network congestion is causing at least some of the packet loss. Thus, method 200 proceeds to step 235. Step 235 reduces the rate of network traffic transmitted by the sending network device. In an embodiment, step 235 reduces the size of the congestion window to decrease the rate that packets are transmitted.

Conversely, if step 230 determines that that the error threshold has not been reached, then method 200 assumes that the lost packets were caused by inherent losses in the network connection, rather than congestion. As a result, method 200 returns to step 205, leaving the network traffic and packet transmission rates unchanged.

In another embodiment, a computationally efficient simplification of method 200 is a loss filter that reduces the congestion window whenever back-to-back packet losses are observed, ignoring all other losses. If the congested network devices perform drop-tail queuing, then packet loss in the presence of congestion will be bursty, causing this algorithm to work particularly well. In this embodiment, the sending device will continue to increase its sending rate until the network becomes so congested that two packets are dropped off the end of the queue of the congested, or bottleneck, network device. When this occurs, the sending detects the back-to-back drops and reduces its congestion window, and hence its sending rate. In the meantime, if corruption-based losses occur in the background and do not typically cause back-to-back losses, then these losses will be ignored by the congestion control algorithm. Note that the bottleneck network device may implement either first-in, first-out (FIFO) drop-tail queuing or some more complex scheduling algorithm like weighted fair queuing. As long as the queuing discipline manages the packets from a common flow in a FIFO drop-tail fashion (as does WFQ), then this embodiment will still function effectively because back-to-back packets will be dropped when the bottleneck router suffers sustained congestion.

Figure 2B:
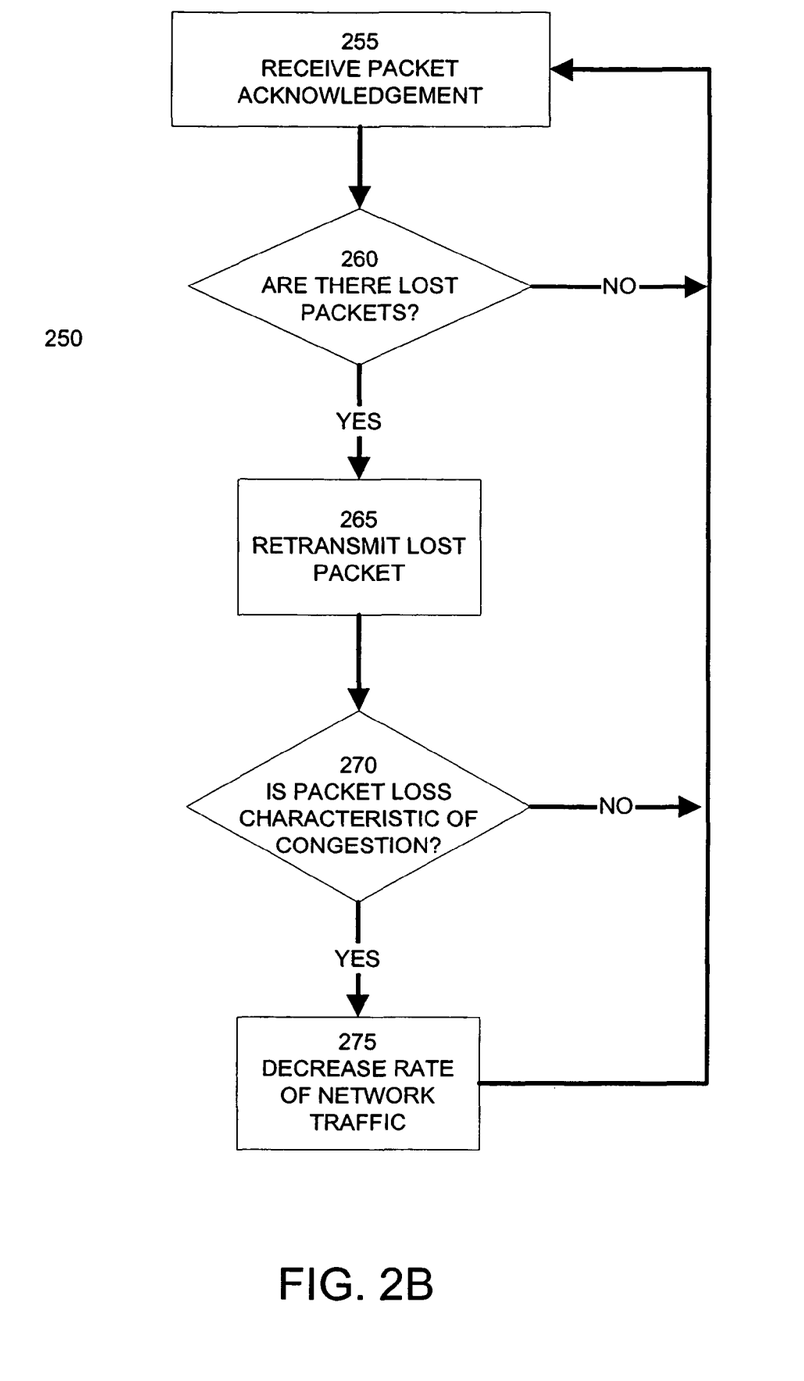

FIG. 2B illustrates a method 250 of detecting and compensating for network congestion and packet loss over lossy network connections according to an embodiment of the invention. Step 255 receives a packet acknowledgement from a receiving network device, the packet acknowledgement indicates to the sending network device that an associated network packet has been successfully received by the receiving network device.

Step 260 determines from the packet acknowledgement and other attributes if there are any lost packets. Packet loss can be determined in a number of different ways known in the art. Additionally, if no acknowledgement of the most recently transmitted data is received within a time period, step 260 may assume that the most recently transmitted data has been lost.

If step 260 determines that no packets have been lost, method 250 proceeds to back to step 255. Conversely, if step 260 determines that one or more packets have been lost, method 250 proceeds to step 265 to retransmit one or more lost packets or portions thereof, depending upon the transport protocol.

Step 270, which may be executed before, in parallel with, or after step 265, determines if the packet loss is characteristic of congestion, In an embodiment, step 270 identifies two consecutive dropped packets as characteristic of congestion. If the lost packets follow this pattern, then it is assumed that network congestion is causing at least some of the packet loss. Thus, method 250 proceeds to step 275. Step 275 reduces the rate of network traffic transmitted by the sending network device. In an embodiment, step 275 reduces the size of the congestion window to decrease the rate that packets are transmitted.

Conversely, if step 270 determines that that the packet loss is not characteristic of congestion, for example if non-consecutive packets are being lost, then method 250 assumes that the lost packets were caused by inherent losses in the network connection, rather than congestion. As a result, method 250 returns to step 255, leaving the network traffic and packet transmission rates unchanged.

Figure 3:
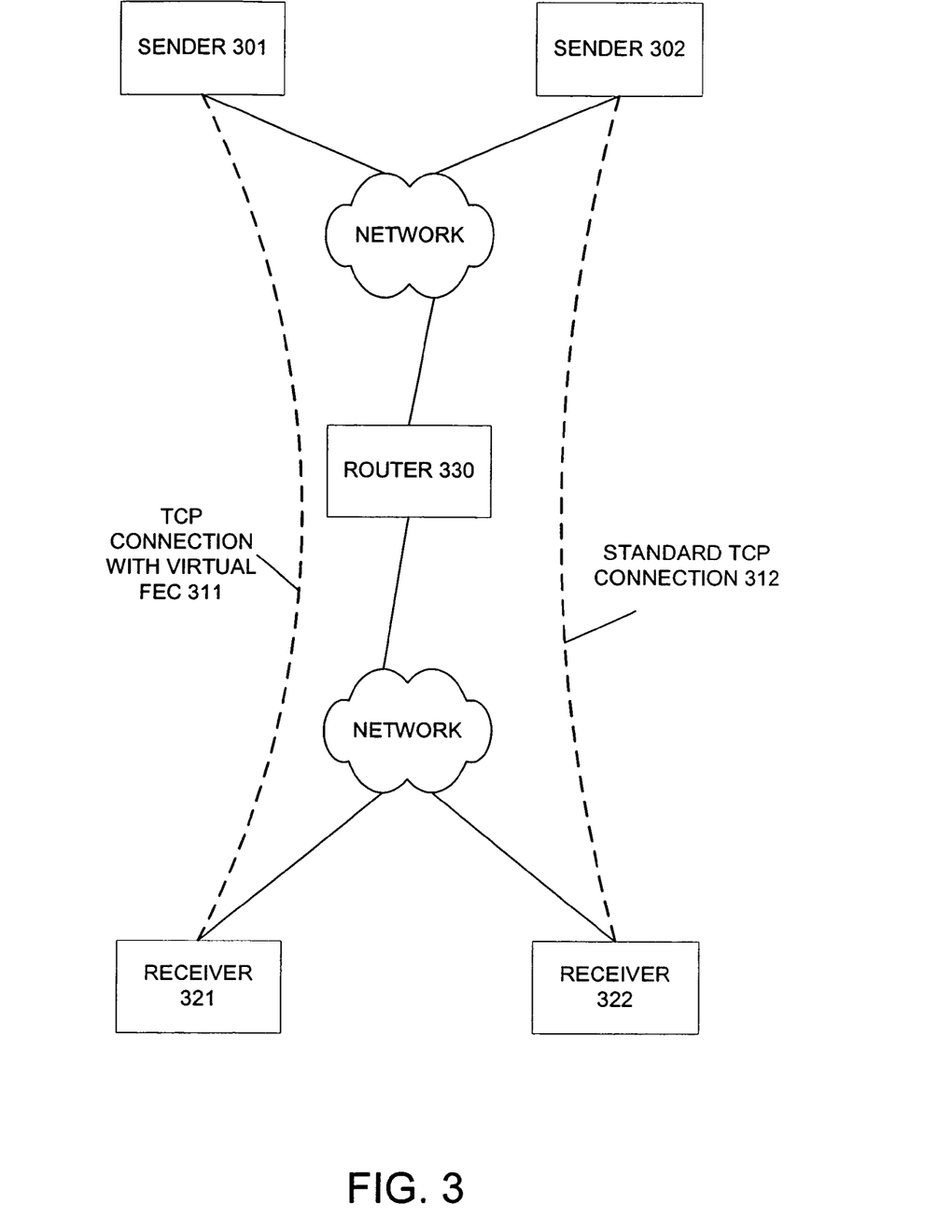
FIGS. 3, 4, and 5 illustrates an example network implementations suitable for use with embodiments of the invention.
Figure 4:
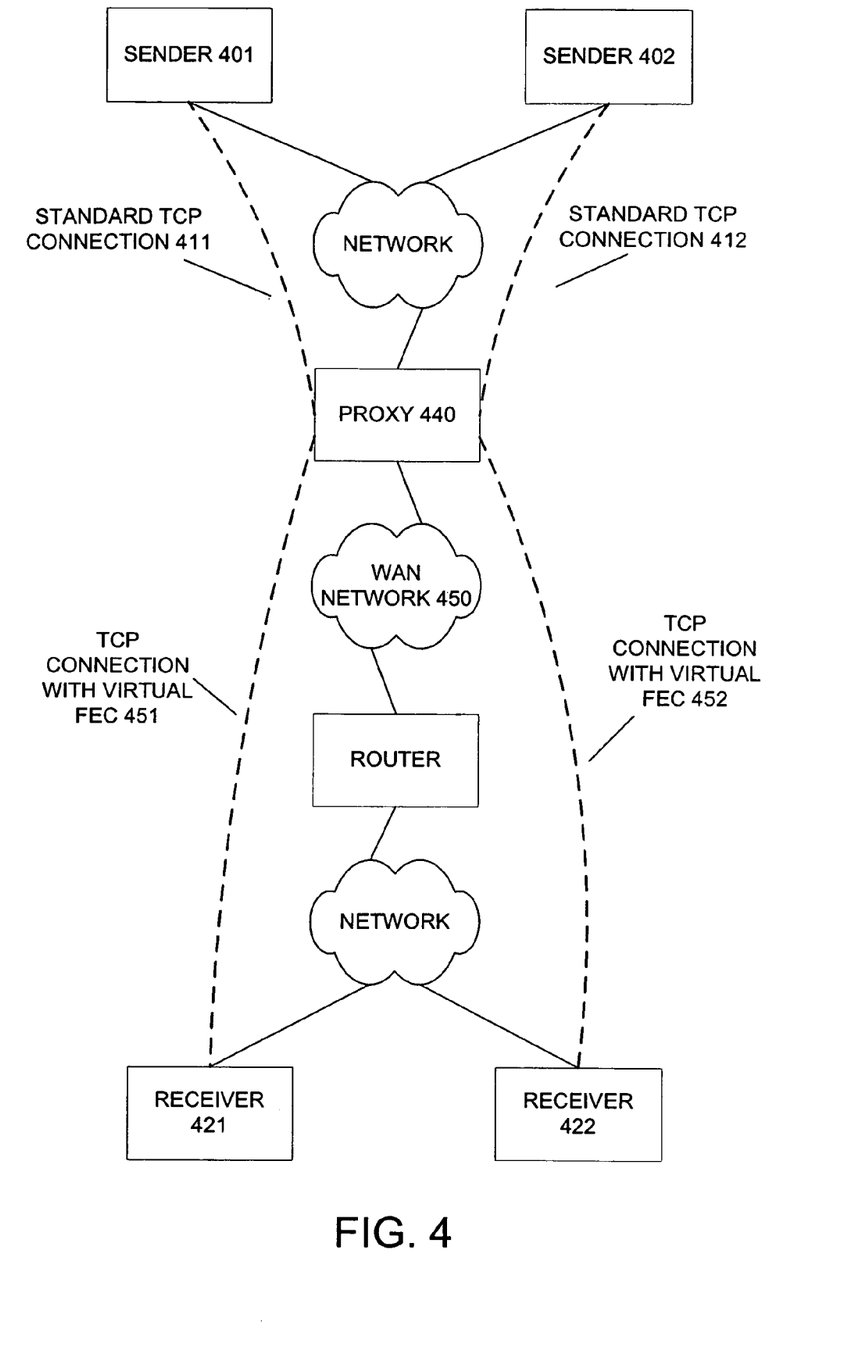
Figure 5:
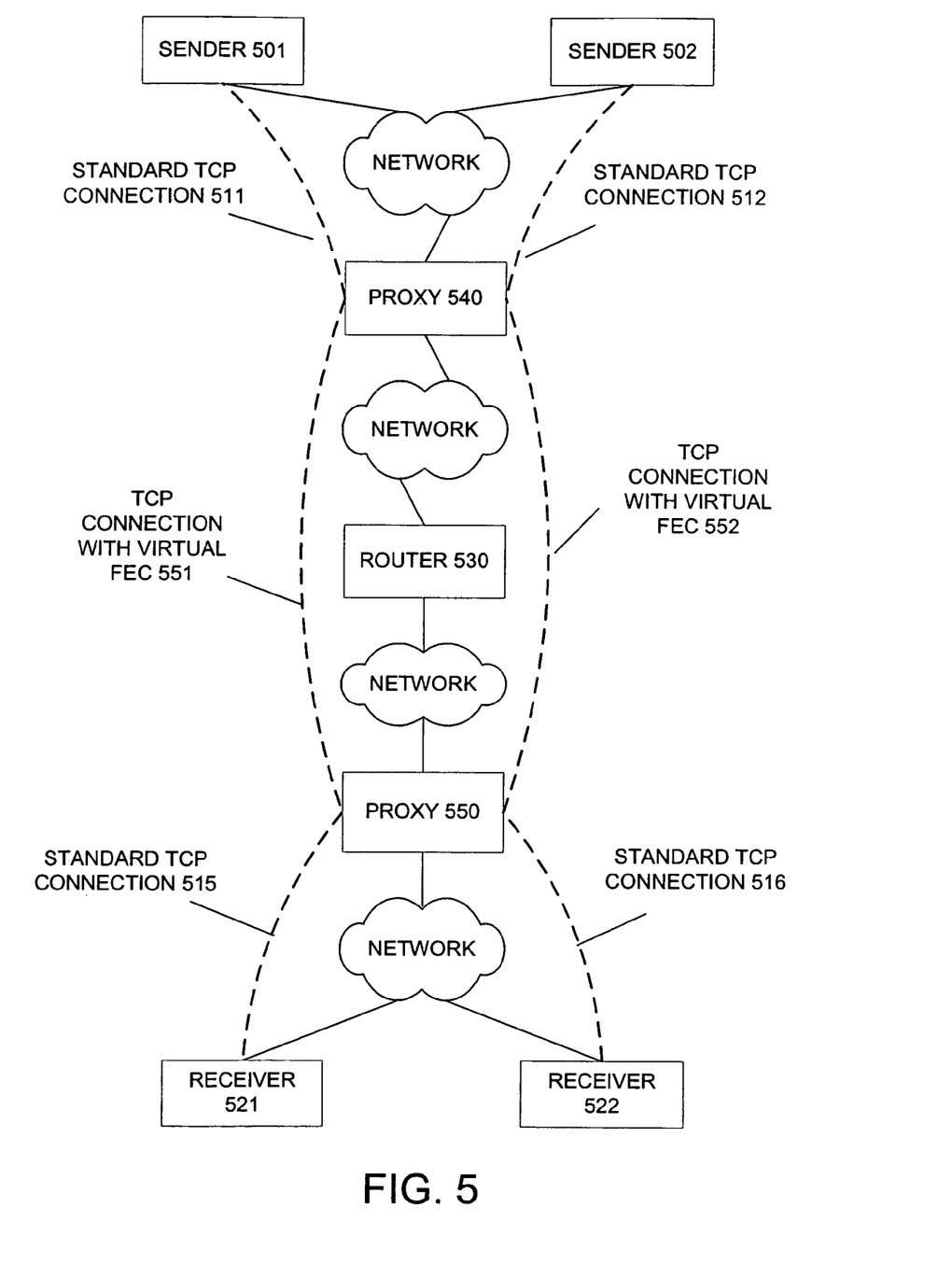

FIGS. 3, 4, and 5 illustrates an example network implementations suitable for use with embodiments of the invention One difficulty that impacts both FEC and virtual FEC is that neither scheme co-exists well with unmodified TCP implementations. For example, FIG. 3 shows two TCP senders, sender 301 and sender 302, where sender 301 implements virtual FEC and sender 302 utilizes an unmodified TCP layer. Sender 301 includes a connection 311 to receiver 321 and sender 302 includes a connection 312 to receiver 322. Both connectionA traverse router 330, which implements drop-tail queuing. It is well known that additive-increase, multiplicative-decrease (AIMD) congestion control algorithms tend to achieve roughly fair resource allocations when two or more connection share a bottleneck link (though it has been shown that there can be biases when there is round-trip time variation among the connections).

In the case of FIG. 3 where a virtual FEC modified TCP layer competes with an unmodified connection, the allocation tends to be very unfair. In this case, when the bottleneck router becomes congested, sender 301 ignores the first packet loss, while sender 302 reacts to the first packet loss by cutting its window in half. This causes the congestion to be alleviated, but now sender 301 is sending at twice the rate of sender 302. As they both continue to increase their sending rate according to the additive increase phase, at some later point the router becomes congested again. Likewise, sender 301 ignores single packet drops while sender 302 reacts by further decreasing its sending rate. Thus, in this scheme, sender 301 will consume a larger portion of the bandwidth of the router 330 than sender 302. A similar phenomenon occurs if sender 301 is protecting its traffic with FEC while sender 302 is not.

One way to avoid this "unfairness" problem is to ensure that every traffic flow in a particular environment implements virtual FEC. In general, this is difficult in practice because it would require modifications to every end host in the network. Alternatively, a transport proxy could be deployed and situated at strategic points in the network to implement virtual FEC from within the network infrastructure. For example, FIG. 4 shows two senders, sender 401 and sender 402, comprising connections 411 and 412, to receivers 421 and 422 respectively.

In the architecture of FIG. 4, these connections are terminated at the intermediary proxy 440, which may either be a transparent or a non-transparent proxy. Proxy 440 further comprises a modified TCP implementation to includes a virtual FEC module. The proxy 440 may optionally include an orientation whereby the proxy 440 designates one of its network interfaces incident to a LAN and another of its interface incident to a WAN 450 and may further include means of configuration to cause virtual FEC to be applied to only a subset of TCP connections, e.g., those belong to a certain protocol or those traversing the WAN interface. In this way, virtual FEC is applied to only the traffic that traverses the WAN 450, where corruption-based loss may occur (e.g., because the WAN 450 includes wireless hops, or satellite hops, or other sources of corruption-based loss). These connections include connections 451 and 452

Similarly, virtual FEC may be applied to a dual-ended proxy, as show in FIG. 5. For example, FIG. 5 shows two senders, sender 501 and sender 502, having connections standard TCP connections 511 and 512, to receivers 521 and 522 respectively. In this scenario, virtual FEC is applied to the inner connections 551 and 552 that occur between the two proxies 540 and 550, in either or both directions simultaneously. Proxy 550 connects with receivers 521 and 522 using standard TCP connections 516 and 515. Likewise, virtual FEC may be deployed as part of a transport-level transaction accelerator or WAN optimizer as described in McCanne I.

While virtual FEC is more effective than traditional FEC applied to transport layers from a channel capacity perspective, there are scenarios where the transport layer is not TCP or where delay is an issue and the need to issue retransmissions negatively impacts protocol performance independent of the channel capacity. In this case, the use of traditional FEC may be preferred over virtual FEC. To address this problem, another embodiment of the present invention allows for a mixture of traditional FEC with virtual FEC. In this approach, traffic classification rules may be used to segregate traffic into different classes. In a typical scenario, a network operator would configure the system performing with FEC and virtual FEC with policies that dictate which traffic types are to be processed either with FEC or with virtual FEC or without any FEC.

Although the invention has been discussed with respect to specific embodiments thereof, these embodiments are merely illustrative, and not restrictive, of the invention. Furthermore, the system architecture discussed above is for the purposes of illustration. The invention can be implemented in numerous different forms including within stand-alone network devices or appliances; as module integrated with other applications, operating systems, or network protocol stacks; or integrated with network interface hardware and software. Furthermore, although the invention has been discussed with reference to the TCP transport layer protocol, embodiments of the invention are equally applicable to any other protocols that allow sending network devices to directly or indirectly detect lost packets. Thus, the scope of the invention is to be determined solely by the claims.

What is claimed is:

1. A method of controlling network congestion, performed by one or more network devices capable of sending and receiving network packets electronically, the method comprising:

monitoring a stream of network packets at a network monitoring device;

detecting a packet loss of at least one network packet;
determining a number of packets lost in a portion of the stream of network packets;
comparing the packet loss to a packet loss model that is based on forward-error correction, the packet loss model modeling at least two packets, to determine if the packet loss is indicative of network congestion or indicative of loss unrelated to network congestion, wherein packet loss patterns that would be recoverable if forward-error correction was used are designated as packet loss unrelated to network congestion and packet loss patterns that would not be recoverable if forward-error correction was used are designated as packet loss due to congestion;
comparing the determined number of packets lost with a number of packets specified by an error threshold for the packet loss model, wherein the error threshold is based at least in part on an amount of packets recoverable by forward-error correction;
when the number of packets lost is above the number of packets specified by the error threshold, determining that the packet loss is indicative of network congestion;
when the number of packets lost is below the number of packets specified by the error threshold, determining that the packet loss is indicative of packet loss unrelated to network congestion; and
selectively reducing the rate of network packets in the stream in response to the determination that the packet loss is indicative of network congestion and maintaining the rate of network packets in the stream under at least one set of conditions when the packet loss is indicative of packet loss unrelated to network congestion.

2. The method of claim 1, wherein the packet loss model specifies an error threshold below which the packet loss could have been recovered using forward error correction.

3. The method of claim 2, wherein the packet loss model simulates the forward error correction.

4. The method of claim 2, wherein the packet loss model approximates the forward error correction using characteristics of the forward error correction.

5. The method of claim 4, wherein the characteristics include a first characteristic representing an amount of packet data and a second characteristic representing an amount of error correction data required by the forward error correction.

6. The method of claim 1, wherein the packet loss model specifies that the packet loss is indicative of inherent losses in a network connection in response to the packet loss not exceeding the error threshold.

7. The method of claim 1, wherein comparing the packet loss to the packet loss model comprises:
determining an amount of lost data in the portion of the stream of network packets; and
comparing the amount of lost data in the portion of the stream with an amount of data specified by the error threshold.

8. The method of claim 1, wherein monitoring the stream of network packets comprises:
transmitting a first set of network packets to a receiving network device; and
receiving at least one acknowledgement message from the receiving network device.

9. The method of claim 8, wherein detecting the packet loss comprises:
comparing a sequence number in the acknowledgement message with a previously-stored sequence number associated with the transmitted first set of network packets.

10. The method of claim 1, wherein monitoring the stream of network packets and detecting the packet loss comprises:
transmitting a first set of network packets to a receiving network device;
initiating a timer to a predetermined value upon transmitting a last one of the first set of network packets;
waiting to receive an acknowledgement message from the receiving network device; and
making the determination that at least one network packet of the first set of network packets is lost when the timer expires prior to receipt of the acknowledgement message.

11. The method of claim 1, further comprising:
retransmitting at least one network packet in the packet loss.

12. The method of claim 1, wherein reducing the rate of network packets in the stream comprises reducing a congestion window value in a transport layer, wherein the congestion window value determines a limit on unacknowledged network packets transmitted.

13. The method of claim 12, wherein the transport layer uses the TCP protocol.

* * * * *